US011925929B1

United States Patent
Barletta, Jr. et al.

(10) Patent No.: US 11,925,929 B1
(45) Date of Patent: Mar. 12, 2024

(54) SLURRY PUMPAROUND SECTION OF A FLUID CATALYTIC CRACKING UNIT FRACTIONATOR

(71) Applicant: PROCESS CONSULTING SERVICES, INC, Houston, TX (US)

(72) Inventors: Anthony Frederick Barletta, Jr., Houston, TX (US); Scott William Golden, Phillips, ME (US); Edward Lee Hartman, Houston, TX (US); Steven Leslie White, Houston, TX (US)

(73) Assignee: PROCESS CONSULTING SERVICES, INC., Houston, TX (US)

( * ) Notice: Subject to any disclaimer, the term of this patent is extended or adjusted under 35 U.S.C. 154(b) by 38 days.

(21) Appl. No.: 17/944,616

(22) Filed: Sep. 14, 2022

(51) Int. Cl.
| | |
|---|---|
| *B01J 8/00* | (2006.01) |
| *B01D 3/26* | (2006.01) |
| *B01D 3/32* | (2006.01) |
| *B01D 3/42* | (2006.01) |
| *C10G 7/12* | (2006.01) |
| *C10G 11/18* | (2006.01) |

(52) U.S. Cl.
CPC .............. *B01J 8/0085* (2013.01); *B01D 3/26* (2013.01); *B01D 3/32* (2013.01); *B01D 3/4222* (2013.01); *B01D 3/4255* (2013.01); *C10G 7/12* (2013.01); *C10G 11/187* (2013.01); *B01J 2208/00902* (2013.01); *C10G 2300/4081* (2013.01); *C10G 2300/708* (2013.01)

(58) Field of Classification Search
CPC . B01J 8/0085; B01J 2208/00902; B01D 3/26; B01D 3/32; B01D 3/4222; B01D 3/4255; C10G 7/12; C10G 11/187; C10G 2300/4081; C10G 2300/708
USPC ....... 203/DIG. 6, 2, 29, 75, DIG. 19, 28, 32, 203/38, 45, 46, 84, 88, 98, 99, 1, 10, 25, 203/27, 3, 34, 36, 37, 40, 41, 42, 57, 6, 203/60, 63, 68, 7, 76, 77, 78, 79, 80, 83, 203/86, 89, 96, DIG. 18, DIG. 9
See application file for complete search history.

(56) References Cited

U.S. PATENT DOCUMENTS

2011/0226607 A1* 9/2011 Anderson ................ C10G 7/08
203/84

* cited by examiner

*Primary Examiner* — Randy Boyer
*Assistant Examiner* — Juan C Valencia
(74) *Attorney, Agent, or Firm* — Patterson + Sheridan, LLP

(57) ABSTRACT

A fluid catalytic cracking unit fractionator comprising a fractionator column having a slurry pumparound section and a bottom liquid section. The slurry pumparound section comprises an upper bed and a lower bed each disposed in the fractionator column. The slurry pumparound section further comprises an upper liquid distributor (such as a spray header comprising a plurality of upper nozzles) disposed above the upper bed and configured to distribute liquid from the bottom liquid section onto the upper bed. The slurry pumparound section also comprises a lower liquid distributor (such as a spray header comprising a plurality of lower nozzles) disposed below the upper bed and above the lower bed and configured to distribute liquid from the bottom liquid section onto the lower bed.

21 Claims, 2 Drawing Sheets

SLURRY PUMPAROUND SECTION OF A FLUID CATALYTIC CRACKING UNIT FRACTIONATOR

BACKGROUND

Field

Embodiments of the present disclosure generally relate to apparatus and method for controlling fluid flow through a slurry pumparound section of a fluid catalytic cracking unit fractionator.

Description of the Related Art

Oil refineries use fluid catalytic cracking units to convert heavy crude oil into lighter products such as liquefied petroleum gas, gasoline, and light cycle oil through a catalytic cracking process. The fluid catalytic cracking unit generally comprises three main vessels: a reactor, a catalyst regenerator, and a fractionator. In the catalytic cracking process, fine catalysts are fluidized and circulated between the reactor and the catalyst regenerator. The reactor contains one or more cyclone separators that separate spent catalyst from hydrocarbon vapors.

The hydrocarbon vapors exit the reactor via a transfer line fluidly coupled with a reactor vapor feed nozzle located near the bottom of the fractionator. The hydrocarbon vapors exit the reactor vapor feed nozzle into a feed zone of the fractionator and flow up through the fractionator. As operators push to increase the amount and rate at which fluid flows through the fractionator, issues such as plugging, flooding, and/or fouling are more frequently encountered within the fractionator, which can significantly reduce throughput and efficiency.

Therefore, there is a need for new and/or improved apparatus and methods for preventing coking in fluid catalytic cracking units.

SUMMARY

In one embodiment, a fluid catalytic cracking unit fractionator comprises a fractionator column; a bottom liquid section disposed at a bottom of the fractionator column; and a slurry pumparound section comprising an upper bed and a lower bed each disposed in the fractionator column; an upper liquid distributor disposed above the upper bed and configured to distribute liquid from the bottom liquid section onto the upper bed; and a lower liquid distributor disposed below the upper bed and above the lower bed and configured to distribute liquid from the bottom liquid section onto the lower bed.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

The present disclosure generally relates to a fluid catalytic cracking unit fractionator configured for catalytic cracking processes. More specifically, the disclosure describes a slurry pumparound section of a fractionator of the fluid catalytic cracking unit configured to operate at high vapor and liquid loads. The slurry pumparound section comprises an upper bed with an upper liquid distributor (such as an upper spray header or an upper gravity flow distributor), and a lower bed with a lower liquid distributor (such as a lower spray header). It is to be noted that only a portion of the fluid catalytic cracking unit fractionator is illustrated in the figures described herein, and other internal and/or external components may be included.

The embodiments of the slurry pumparound section of the fractionator described herein are configured to operate with a high vapor load, also referred to as c-factor, such as within a range of 0.40-0.50 feet per second (ft/s). C-factor is a term commonly used to quantify vapor loading within different sections of the fractionator.

C-factor may be calculated by the equation:

$$\text{C-factor} = (\text{Vapor CFS}/\text{Cross Sectional Area}) * \sqrt{(\text{Vapor Density}/(\text{Liquid Density} - \text{Vapor Density}))};$$

where Vapor CFS=Vapor Volumetric Flow Rate in $ft_3/sec$, and where Cross Sectional Area=Area in $ft^2$.

In addition to a high c-factor (i.e., vapor load), the slurry pumparound section is configured to operate with a high liquid flow rate, also referred to as liquid loading, such as within a range of 20-30 gallons per minute/feet squared ($gpm/ft^2$). With the slurry pumparound section configured to operate with a high c-factor and a high liquid load, the embodiments of the fractionator as described herein are configured to operate at a feed rate of unit capacity within a range of 30,000-225,000 barrels per day.

Figure 1:
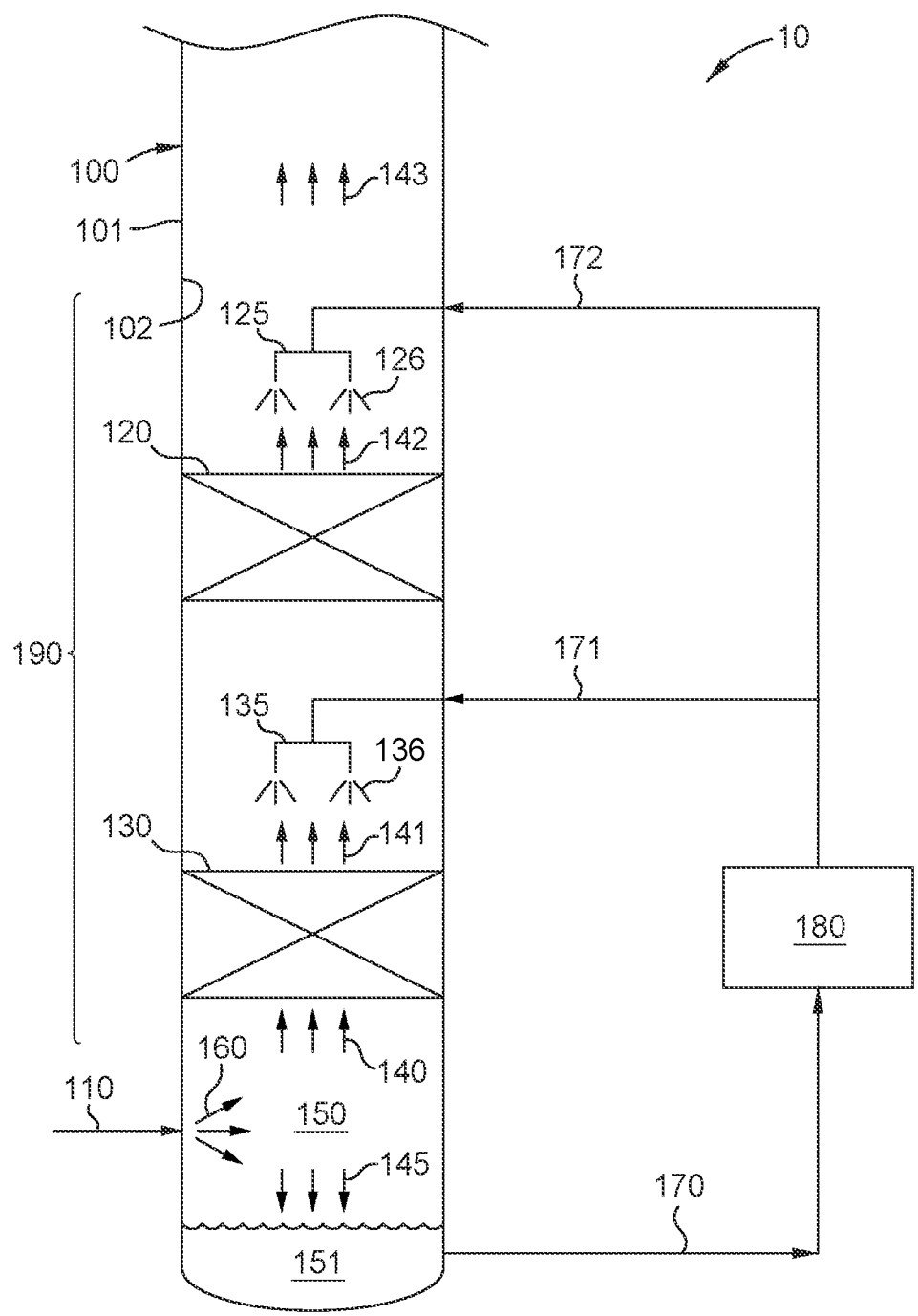
FIG. 1 is a partial schematic side view of a fluid catalytic cracking unit fractionator, according to one embodiment.

FIG. 1 is a partial schematic side view of a fluid catalytic cracking unit fractionator 10, according to one embodiment. The fluid catalytic cracking unit fractionator 10 comprises a fractionator 100 having a fractionator column 101 in the form of a cylindrical vessel. A reactor vapor feed nozzle 110 is coupled to the fractionator column 101 and directs effluent vapor 160, for example hydrocarbon vapor, into the fractionator column 101.

An interior 102 of the fractionator 100 forms multiple zones and sections, one of which is a feed zone 150 into which the effluent vapor 160 is directed via the reactor vapor feed nozzle 110. The velocity in the feed pipe at which the effluent vapor 160 flows into the feed zone 150 may be within a range of 70-150 feet per second (ft/s). Below the feed zone 150 is a bottom liquid section 151 formed at the bottom of the fractionator column 101 where liquid that condenses out of the effluent vapor 160, illustrated by reference arrows 145, can accumulate. The liquid at the bottom of the fractionator column 101 in the bottom liquid section 151 may also be referred to herein as a slurry product. Contaminants such as coke particles may be contained within the slurry product.

A portion of the liquid in the bottom liquid section 151 may be directed to a slurry pumparound section 190 located above the feed zone 150, and sprayed onto the effluent vapor 160 flowing up through the slurry pumparound section 190 (illustrated by reference arrows 140, 141, 142, 143) to cool and lower the temperature of the effluent vapor 160. The slurry pumparound section 190 therefore acts as a cooling or de-superheating zone. The slurry pumparound section 190 is the first pumparound section, e.g. the first section within the fractionator column 101 that contacts the effluent vapor 160. The slurry pumparound section 190 de-superheats the effluent vapor 160 with a portion of the slurry product from the bottom liquid section 151. The portion of the slurry product withdrawn from the fractionator column 101 that is cooled and used to de-superheat the effluent vapor 160 is also referred to as the slurry pumparound. The slurry pumparound section 190 is located directly above the feed zone 150 and is the pumparound section closest to the bottom liquid section 151. As further described below, liquid that has been withdrawn from the bottom liquid section 151 of the fractionator column 101 (i.e. slurry pumparound) is circulated back into the fractionator column 151 via the slurry pumparound section 190.

The temperature of the effluent vapor 160 flowing into the slurry pumparound section 190, illustrated by reference arrows 140, may be within a range of 940-1,030 degrees Fahrenheit. The temperature of the effluent vapor 160 flowing out of the slurry pumparound section 190, illustrated by reference arrows 143, may be within a range of 600-750 degrees Fahrenheit. The c-factor of the effluent vapor 160 flowing from the upper bed 120, illustrated by reference arrows 142, may be within a range of 0.35-0.45 ft/s. The c-factor of the effluent vapor 160 flowing from the lower bed 130, illustrated by reference arrows 141, may be within a range of 0.40-0.50 ft/s.

From the feed zone 150, the effluent vapor 160 begins to rise and flows up into the slurry pumparound section 190, as illustrated by reference arrows 140. The slurry pumparound section 190 comprises an upper bed 120 and a lower bed 130 each disposed in the fractionator column 101. The upper and lower beds 120, 130 each comprise grid packing, which comprises multiple layers of stacked, rigid, corrugated, and/or slanted sheets of metal. The grid packing in the upper bed 120 may be within a range of 4-6 feet in height. The grid packing in the lower bed 130 may be within a range of 2-5 feet in height. A height of the grid packing in the upper bed 120 may be greater than a height of the grid packing in the lower bed 130. Commercially available grid packing, such as Flexigrid®, or Proflux®, may be used for the upper and lower beds 120, 130.

The slurry pumparound section 190 further comprises an upper liquid distributor 125 disposed above the upper bed 120. The upper liquid distributor 125 may be in the form of an upper spray header or a gravity flow distributor. A gravity flow distributor may be a trough distributor, which consists of narrow boxes called troughs, and one or more parting boxes. Liquid is directed into the one or more parting boxes, which feed the liquid to the troughs, which then direct the liquid onto the upper bed 120 all via gravity distribution. The upper liquid distributor 125 is configured to distribute liquid (from the bottom liquid section 151) onto the upper bed 120. The slurry pumparound section 190 further comprises a lower liquid distributor 135 disposed below the upper bed 120 and above the lower bed 130. The lower liquid distributor 125 may be in the form of a lower spray header. The lower liquid distributor 135 is configured to distribute liquid (from the bottom liquid section 151) onto the lower bed 130. Liquid from the bottom of the upper bed 120 falls onto the lower bed 130.

Liquid from the bottom liquid section 151, located at the bottom of the fractionator column 101, may be directed out of the fractionator column 151 via a fluid line 170 and into a heat exchanger/filter assembly 180. The temperature of the liquid in the bottom liquid section 151 may be within a range of 650-700 degrees Fahrenheit. The portion of the liquid removed from the bottom liquid section 151 (i.e. the slurry pumparound) may be cooled via the heat exchanger/filter assembly to a temperature within a range of 450-600 degrees Fahrenheit. In addition, any solid materials in the slurry pumparound may be removed from the slurry pumparound via the heat exchanger/filter assembly 180. The liquid may then be directed to the upper liquid distributor 125 via an upper fluid line 172 to be distributed, such as sprayed, onto the upper bed 120. The temperature of the liquid distributed from the upper spray header 125 may be within a range of 450-600 degrees Fahrenheit. The liquid may also be directed to the lower liquid distributor 135 via a lower fluid line 171 to be distributed, such as sprayed, onto the lower bed 130. The temperature of the liquid distributed from the lower spray header 135 may be within a range of 450-600 degrees Fahrenheit.

The upper liquid distributor 125 when in the form of a spray header comprises a plurality of upper nozzles 126. The lower liquid distributor 135 when in the form of a spray header comprises a plurality of lower nozzles 136. A liquid loading rate to the upper bed 120 is less than a liquid loading rate to the lower bed 130. For example, a liquid loading rate to the upper bed 120 may be within a range of 10-15 gallons per minute/feet squared ($gpm/ft^2$), and a liquid loading rate to the lower bed may be within a range of 20-30 $gpm/ft^2$. The liquid loading rate to lower bed 130 is greater than the liquid loading rate to the upper bed 120 because liquid from the bottom of the upper bed 120 falls onto the top of the lower bed 130, in addition to the liquid distributed onto the top of the lower bed 130 from the plurality of lower nozzles 136. Any liquid entrained in the effluent vapor 160 flowing up from the lower bed 130 may be washed by the liquid falling down from the upper bed 120.

Figure 2:
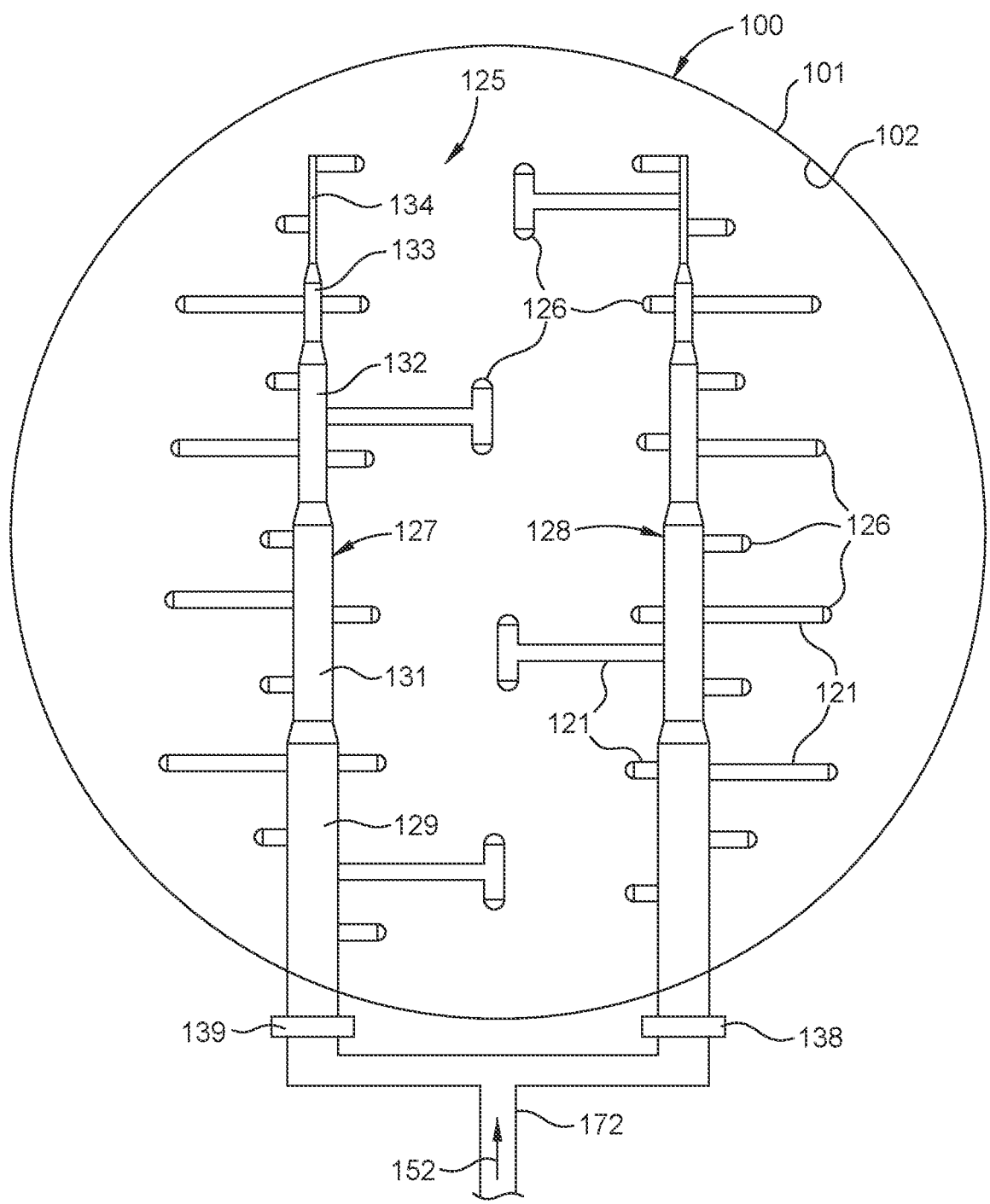
FIG. 2 is a schematic plan view of a spray header of the fluid catalytic cracking unit fractionator, according to one embodiment.

FIG. 2 is a schematic plan view of the upper liquid distributor 125, when in the form of a spray header, of the fractionator 100, according to one embodiment. The description and illustration of the upper spray header 125 in FIG. 2 similarly applies to the lower liquid distributor 135 when in the form of a spray header. Referring to FIG. 2, the upper spray header 125 comprises a first header pipe 127 and a second header pipe 128, each in the form of a tubular member. The first header pipe 127 has an inlet 139 in fluid communication with the upper fluid line 172. The second header pipe 128 has an inlet 138 in fluid communication with the upper fluid line 172. The tubular members forming the first and second headers pipes 127, 128 have variable outer and inner diameters. The reason for the variable diameter is to maintain the velocity of the slurry pumparound in the upper fluid line 172 as the liquid rate in the upper spray header 125 is lowered. Specifically, the diameter of the first and second header pipes 127, 128 decreases along the length from the end of the first and second header pipes 127, 128 proximate the inlets 139, 138 to the opposite distal ends.

For example, the first header pipe 127 has a first portion 129 with a diameter greater than the diameter of an adjacent second portion 131. The second portion 131 has a diameter greater than the diameter of an adjacent third portion 132. The third portion 132 has a diameter greater than the diameter of an adjacent fourth portion 133. The fourth portion 133 has a diameter greater than the diameter of an adjacent fifth portion 134. The diameters of the first, second, third, fourth, and fifth portions 129, 131, 132, 133, 134 may be within a range of 3-16 inches. For example, the first portion 129 may have a diameter of 12 inches, and the fifth portion 134 may have a diameter of 4 inches. The second header pipe 128 has a similar structure as the first header pipe 127.

The first, second, third, fourth, and fifth portions 129, 131, 132, 133, 134 are in fluid communication with each other and direct fluid (such as liquid from the bottom liquid section 151) to the plurality of upper nozzles 126. The plurality of upper nozzles 126 are located along the length of the first and second header pipes 127, 128 and are spaced outwardly from the first and second header pipes 127, 128 via one or more nozzle extensions 121 that are also in the form of tubular members. The nozzle extensions 121 may vary in length. A pair of nozzles 126 may be coupled to one or more nozzle extensions 121.

The lengths, diameters, locations, numbers, orientations, and/or arrangements of the first and second header pipes 127, 128, the nozzle extensions 121, and/or the plurality of upper nozzles 126 may be adjusted to fit any fractionator column size and/or fractionator operating requirements. The embodiments of the upper spray header 125 and/or lower spray header 135 are not limited to the specific lengths, diameters, locations, numbers, orientations, and/or arrangements of the first and second header pipes 127, 128, the nozzle extensions 121, and/or the plurality of upper nozzles 126 illustrated in FIG. 2.

The plurality of upper and lower nozzles 126, 136 are configured to distribute large liquid droplets to minimize entrainment (e.g. liquid trapped within or carried upward by the effluent vapor) within the fractionator column 101. Specifically, when the c-factor of the effluent vapor gets high, e.g. above 0.4 ft/s, liquid droplets can be carried upward with the rising effluent vapor. The smaller the liquid droplet, the easier the liquid droplet is entrained upward with the effluent vapor. Large liquid droplets minimize entrainment because they are heavier. In one example, the plurality of upper and lower nozzles 126, 136 are configured to distribute droplets of liquid having a diameter greater than 700 microns. The plurality of upper and lower nozzles 126, 136 are sized to operate in within a pressure drop range of 4-20 psi.

The plurality of upper and lower nozzles 126, 136 are configured to allow free passage of the liquid to minimize the potential of plugging of one or more of the plurality of upper and lower nozzles 126, 136. An inner diameter of the plurality of upper nozzles 126 may be the same or greater than an inner diameter of the plurality of lower nozzles 136. For example, the inner diameter of the plurality of upper nozzles 126 is 1 inch or greater, and the inner diameter of the plurality of lower nozzles 136 is 1 inch or greater. A flow rate per nozzle of the plurality of upper nozzles 126 is within a range of 100-160 gpm. A flow rate per nozzle of the plurality of lower nozzles 136 is within a range of 90-130 gpm.

The layouts of the upper and lower spray headers 125, 135 may be identical. The plurality of upper nozzles 126 may comprise 38 spray nozzles. For example, the plurality of upper nozzles 126 may comprise any number of spray nozzles within a range of 20-62 spray nozzles. The plurality of lower nozzles 136 may comprise 38 spray nozzles. For example, the plurality of lower nozzles 136 may comprise any number of spray nozzles within a range of 20-62 spray nozzles. The bottom of the plurality of upper nozzles 126 may be within a range of 30-35 inches above the top of the upper bed 120. The bottom of the plurality of lower nozzles 136 may be within a range of 30-35 inches above the top of the lower bed 130.

The liquid rate from the upper spray header 125 to the upper bed 120 may be within a range of 35,000-265,000 barrels per day. Because liquid from the upper bed 120 falls down onto the lower bed 130, the upper bed 120 acts as a demister to enhance the removal of liquid droplets entrained in the effluent vapor 160 flowing up from the lower bed 130. The liquid rate from the lower spray header 135 to the lower bed 130 may be within a range 25,000-205,000 barrels per day. A portion of the liquid falling from the upper bed 120 toward the lower bed 130 may be vaporized by the effluent vapor 160 before reaching the lower bed 130.

Any of the embodiments recited above may be combined, in whole or part, with any of the other embodiments recited above. It will be appreciated by those skilled in the art that the preceding embodiments are exemplary and not limiting. It is intended that all modifications, permutations, enhancements, equivalents, and improvements thereto that are apparent to those skilled in the art upon a reading of the specification and a study of the drawings are included within the scope of the disclosure. It is therefore intended that the following appended claims may include all such modifications, permutations, enhancements, equivalents, and improvements.

While the foregoing is directed to embodiments of the present disclosure, other and further embodiments of the disclosure may be devised without departing from the basic scope thereof, and the scope thereof is determined by the claims that follow.

We claim:

1. A fluid catalytic cracking unit fractionator, comprising:
a fractionator column;
a bottom liquid section disposed at a bottom of the fractionator column; and
a slurry pumparound section comprising:
an upper bed and a lower bed each disposed in the fractionator column, wherein the bottom liquid section is disposed below the lower bed;
an upper liquid distributor disposed above the upper bed and configured to distribute liquid from the bottom liquid section onto the upper bed; and
a lower liquid distributor disposed below the upper bed and above the lower bed and configured to distribute liquid from the bottom liquid section onto the lower bed.

2. The fractionator of claim 1, wherein the upper liquid distributor is an upper gravity flow distributor, and wherein the lower liquid distributor is a lower spray header comprising a plurality of lower nozzles.

3. The fractionator of claim 1, wherein the upper liquid distributor is an upper spray header comprising a plurality of upper nozzles, and wherein the lower liquid distributor is a lower spray header comprising a plurality of lower nozzles.

4. The fractionator of claim 3, further comprising an upper fluid line configured to direct fluid from the bottom liquid section that has been cooled to the upper spray header, and a lower fluid line configured to direct fluid from the bottom liquid section that has been cooled to the lower spray header.

5. The fractionator of claim 3, wherein an inner diameter of the plurality of upper nozzles is greater than an inner diameter of the plurality of lower nozzles.

6. The fractionator of claim 3, wherein a flow rate per nozzle of the plurality of upper nozzles is within a range of 100-160 gpm, and wherein a flow rate per nozzle of the plurality of lower nozzles is within a range of 90-130 gpm.

7. The fractionator of claim 3, wherein the plurality of upper and lower nozzles are configured to distribute droplets of liquid having a diameter greater than 700 microns.

8. The fractionator of claim 3, wherein the plurality of upper and lower nozzles are each located within a range of 30-35 inches above the upper and lower beds, respectively.

9. The fractionator of claim 3, wherein the plurality of upper nozzles are configured to distribute liquid onto the upper bed at a rate within a range of 35,000-265,000 barrels per day.

10. The fractionator of claim 3, wherein the plurality of lower nozzles are configured to distribute liquid onto the lower bed at a rate within a range of 25,000-205,000 barrels per day.

11. The fractionator of claim 3, wherein the upper and lower spray headers comprise a header pipe having a variable diameter along a length of the header pipe.

12. The fractionator of claim 3, wherein the inner diameter of the plurality of upper and lower nozzles is 1 inch or greater.

13. The fractionator of claim 3, wherein the plurality of upper and lower nozzles are sized to operate in within a pressure drop range of 4-20 psi.

14. The fractionator of claim 1, wherein a liquid loading rate to the upper bed is less than a liquid loading rate to the lower bed.

15. The fractionator of claim 1, wherein effluent vapor flows into the slurry pumparound section at a temperature within a range of 940-1,030 degrees Fahrenheit, and wherein the effluent vapor flows out of the slurry pumparound section at a temperature within a range of 600-750 degrees Fahrenheit.

16. The fractionator of claim 1, wherein a feed rate of unit capacity flowing into the fractionator column is within a range of 30,000-225,000 barrels per day, wherein a c-factor of effluent vapor flowing from the upper bed is within a range of 0.35-0.45 ft/s, and wherein a c-factor of the effluent vapor flowing from the lower bed is within a range of 0.40-0.50 ft/s.

17. The fractionator of claim 1, wherein the upper and lower beds each comprise grid packing, wherein a height of the grid packing in the upper bed is greater than a height of the grid packing in the lower bed.

18. The fractionator of claim 1, further comprising a heat exchanger/filter assembly configured to remove solid materials from the liquid from the bottom liquid section.

19. The fractionator of claim 1, wherein a temperature of the liquid distributed from the upper liquid distributor may be within a range of 450-600 degrees Fahrenheit, and wherein a temperature of the liquid distributed from the lower liquid distributor may be within a range of 450-600 degrees Fahrenheit.

20. The fractionator of claim 1, wherein the upper liquid distributor is an upper spray header comprising a plurality of upper nozzles, wherein the lower liquid distributor is a lower spray header comprising a plurality of lower nozzles, wherein the upper and lower spray headers comprise a header pipe having a variable diameter along a length of the header pipe, and wherein the fractionator further comprises an upper fluid line configured to direct fluid from the bottom liquid section that has been cooled to the upper spray header, and a lower fluid line configured to direct fluid from the bottom liquid section that has been cooled to the lower spray header.

21. A fluid catalytic cracking unit fractionator, comprising:
 a fractionator column;
 a bottom liquid section disposed at a bottom of the fractionator column; and
 a slurry pumparound section comprising:
  an upper bed and a lower bed each disposed in the fractionator column;
  an upper liquid distributor disposed above the upper bed and configured to distribute liquid from the bottom liquid section onto the upper bed;
  a lower liquid distributor disposed below the upper bed and above the lower bed and configured to distribute liquid from the bottom liquid section onto the lower bed; and
 a heat exchanger/filter assembly configured to remove solid materials from the liquid from the bottom liquid section.

* * * * *